(12) United States Patent
Adelman et al.

(10) Patent No.: US 7,752,313 B2
(45) Date of Patent: *Jul. 6, 2010

(54) PARTNER WEB SITE TO ASSIST IN OFFERING APPLICATIONS TO A WEB HOSTING COMMUNITY

(75) Inventors: Warren Adelman, Scottsdale, AZ (US); Michael Chadwick, Chandler, AZ (US)

(73) Assignee: The Go Daddy Group, Inc., Scottsdale, AZ (US)

(*) Notice: Subject to any disclaimer, the term of this patent is extended or adjusted under 35 U.S.C. 154(b) by 197 days.

This patent is subject to a terminal disclaimer.

(21) Appl. No.: 11/708,729

(22) Filed: Feb. 21, 2007

(65) Prior Publication Data

US 2008/0201473 A1   Aug. 21, 2008

(51) Int. Cl.
*G06F 15/16* (2006.01)

(52) U.S. Cl. .................. 709/226; 709/203; 709/225; 709/206; 709/229; 709/218; 709/200; 709/201; 709/202; 709/217; 705/53; 705/40; 705/34; 705/77; 705/79

(58) Field of Classification Search ............... 709/226, 709/229, 200–203, 217, 218, 206, 225
See application file for complete search history.

(56) References Cited

U.S. PATENT DOCUMENTS

| | | | | |
|---|---|---|---|---|
| 2007/0266034 | A1* | 11/2007 | Pousti et al. | 707/10 |
| 2008/0071883 | A1* | 3/2008 | Alterman | 709/217 |
| 2008/0209451 | A1* | 8/2008 | Michels et al. | 719/328 |
| 2008/0306883 | A1* | 12/2008 | Baffier et al. | 705/400 |

* cited by examiner

*Primary Examiner*—Jude J Jean Gilles
(74) *Attorney, Agent, or Firm*—Stewart J. Womack

(57) ABSTRACT

An example embodiment for using a Partner Web Site within a Web Hosting Community starts with a Hosting Provider creating the Partner Web Site, a Community Web Site, and operating one or more Hosting Servers. A Partner, from the Partner Web Site, may make an application available for purchase and use to a plurality of Hosting Customers. At least one of the Hosting Customers, from the Community Web Site, may purchase and utilize the application with their Hosted Web Site.

26 Claims, 9 Drawing Sheets

Web Hosting Community 100

PARTNER WEB SITE TO ASSIST IN OFFERING APPLICATIONS TO A WEB HOSTING COMMUNITY

CROSS REFERENCE TO RELATED PATENT APPLICATION

This patent application is related to the following patent applications concurrently filed herewith, all assigned to The Go Daddy Group, Inc.:

U.S. patent application Ser. No. 11/708,737, "A Web Hosting Community";

U.S. patent application Ser. No. 11/708,736, "A Community Web Site for Creating and Maintaining a Web Hosting Community"; and U.S. patent application Ser. No. 11/708,976, "A Certification Process for Applications Entering a Web Hosting Community".

FIELD OF THE INVENTION

The present invention relates to a Web Hosting Community comprising a Hosting Provider, a plurality of Hosting Customers and a plurality of Partners wherein the Community shares information and allows for the sale of the Partner's application program(s) to the Hosting Customers.

BACKGROUND OF THE INVENTION

The Internet is a global network of interconnected computers that allows individuals and organizations (collectively Internet users) around the world to communicate and share information with each other. The World Wide Web (WWW), also known as the Web, is a collection of information resources contained in documents located on individual computers around the world and is one of the fastest growing parts of the Internet.

Prevalent on the Web are multimedia Web sites offering and selling goods and services to individuals and organizations, i.e. Customers. Web sites may consist of a single Web page, but typically consist of multiple interconnected and related Web pages. Web sites, unless extremely large and complex or have unusual traffic demands, typically reside on a single server and are prepared and maintained by a single Hosting Customer. Menus and links may be used to move between different Web pages within the Web site or to move to a different Web site as is known in the art. The interconnectivity of Web pages enabled by the Internet can make it difficult for Internet users to tell where one Web site ends and another begins.

Each computer or server on the Internet is assigned a unique identifier known as an Internet Protocol (IP) address. A computer or server may host one or more Web sites. IP addresses are difficult to remember so a domain name service (DNS) associates Web sites' IP addresses with their corresponding domain names. This permits a Customer to enter an easily remembered domain name into a browser, and the browser, via the DNS, locates the unique IP address and thus the location of the Web site. Another advantage of the DNS is that the Web site may move its physical location on the Internet, i.e. receive a new IP address, but by making the appropriate changes in the DNS, the Web site may still be located using the original domain name.

Internet businesses, whether a natural person or a legal entity, are rapidly creating Web sites to take advantage of the growing number of Customers using the Internet and Customers' increasing willingness to purchase goods and services over the Web. Web sites created by Internet businesses may be reached by millions of Internet savvy Customers, thereby allowing Internet businesses to offer their products and services to a very large pool of potential Customers.

Some Internet businesses, typically larger more sophisticated ones, may provide their own hardware, software and connections to the Internet. However, many Internet businesses either do not have the resources available or do not want to create and maintain the infrastructure necessary to host their own Web sites. To assist these Internet businesses in operating their Web sites, many companies (known as Hosting Providers) are offering hosting services for Web sites. Hosting Providers typically provide the hardware, software and electronic communication means necessary to connect multiple Hosted Web Sites to the Internet. A single Hosting Provider may literally host thousands of Web sites on one or more Hosting Servers.

After a Hosting Customer has purchased hosting services from a Hosting Provider, the Hosting Customer may want to utilize one or more applications (software programs or Internet services) in conjunction with their Hosted Web Site. The Hosting Customer may also want to read reviews or ratings regarding the applications they may want to purchase. Thus, a Hosting Customer may have to visit an independent Web site to read independent reviews of the application, a second Web site to purchase the application from a distributor of the application if they liked the reviews, and then a third Web site to try to install or make the application available for their Hosted Web Site.

In purchasing the application, the Hosting Customer may have to purchase the application stored on one of the many known types of storage mediums, such as a floppy disk, Compact Disk (CD) or DVD. The purchase may take place over the Internet and the Hosting Customer may have to wait for the application to be shipped to their address. Alternatively, the Hosting Customer may go to a local computer store and purchase the application. A faster approach is to have the application downloaded from the distributor's Web site to the Hosting Customer's computer. Once the Hosting Customer has the application (either stored on a storage medium or as a file loaded on the Hosting Customer's computer) the Hosting Customer may use File Transfer Protocol (FTP) to load the application to the Hosting Customer's Hosted Web Site.

This process may have to be repeated for each application the Hosting Customer may want to use with its Hosted Web Site. Hosting Customers have the additional problem of not having any assurances that the application they purchased will be compatible or usable by their Hosted Web Sites until after they have tried to use it.

The developers and distributors (hereafter distributors) of applications also have problems in providing information to the Hosting Customers and in making it easy for the Hosting Customers to use their products with the Hosting Customer's Hosted Web Site. Unless the Hosting Customer happens to visit the distributor's Web site, many Hosting Customers may not even be aware of the distributor's application(s). The distributors also, since they do not have access to the Hosting Customer's Hosted Web Site, are not able to automatically install or make available their applications to the Hosting Customer, making the process of using the application more complicated.

Hosting Providers have their own set of issues. Hosting Providers want their Hosting Customers to be satisfied with their hosting services. To increase the level of satisfaction with their services, Hosting Providers want to make as many quality applications available to their Hosting Customers as possible while ensuring that the applications are compatible with the infrastructure supporting the Hosted Web Sites. Hosting Providers also want to ensure that the applications will not cause other problems for themselves or their Hosting Customers. Hosting Providers may also want to make additional revenue when their Hosting Customers purchase applications or through advertising on their Web sites.

Therefore, new systems and processes are needed to assist in the exchange of information among and between the Hosting Provider, Hosting Customers and distributors of applications. In addition, new systems and processes are needed to make it easier for a Hosting Customer to research applications, purchase applications and then to make those applications available for use by their Hosted Web Site. In addition, new systems and processes are needed to ensure that applications purchased and utilized by Hosting Customers are compatible and will not cause problems when used by their Hosted Web Sites.

SUMMARY

Additional advantages and aspects of the present invention will become apparent in the following detailed description of the invention and the claims.

An example embodiment of a Web Hosting Community includes at least three members, i.e. a Hosting Provider, a Hosting Customer and a Partner. The Hosting Provider may have one or more Hosting Servers, and create and maintain a Partner Web Site and a Community Web Site. The Partner Web Site and the Community Web Site may provide tools that are tailored for the needs of the Partner and the Hosting Customer, respectively, to participate in the Web Hosting Community. The Partner may provide an application, i.e. software program, to be integrated into the Web Hosting Community and the Hosting Customer may purchase and install the application onto its Hosted Web Site which is stored on a Hosting Server.

An example embodiment of a Community Web Site includes a Home Page, a Web Presence Tool Page, and a Product and Community Forum which is created and maintained by a Hosting Provider. The Home Page may be made accessible to Hosting Customers and Partners and is an ideal location for placement of ads since all members of the Web Hosting Community are funneled through this Web page. The Web Presence Tool Page may display information generated by a Partner regarding the Partner's application which may be viewed by the Hosting Customers. The Product and Community Forum may allow the Hosting Customers to share information regarding all the applications with other Hosting Customers.

An example embodiment for using a Partner Web Site within a Web Hosting Community starts with a Hosting Provider creating the Partner Web Site, a Community Web Site, and operating one or more Hosting Servers. A Partner, from the Partner Web Site, may make an application available for purchase and use to a plurality of Hosting Customers. At least one of the Hosting Customers, from the Community Web Site, may purchase and utilize the application with their Hosted Web Site.

An example of a certification process for an application to be made available to a plurality of Hosting Customers within a Web Hosting Community starts with a partner, from a Partner Web Site, submitting the application to a Hosting Provider. The Hosting Provider may perform a test on the application to verify the application conforms to a predetermined standard. The Hosting Provider may perform one or more manual or automated test and look for viruses, worms, Trojan horses, adware, malware, reliability/compatibility issues or other problems with the application that may adversely impact the Web Hosting Community. If the application passes the test, the Hosting Provider may make the application available to the plurality of Hosting Customers. In preferred embodiments, when a Hosting Customer purchases the application, the Hosting Provider is triggered to automatically make the application available for use by the Hosting Customer's Hosted Web Site.

BRIEF DESCRIPTION OF THE DRAWINGS

FIG. 6 is a screen shot of an example Web page for a Partner Web Site.

FIG. 7 is a screen shot of another example Web page for a Partner Web Site.

FIG. 8 is a screen shot of an example Web page for a Community Web Site.

DETAILED DESCRIPTION OF THE PREFERRED EMBODIMENTS

Figure 1:
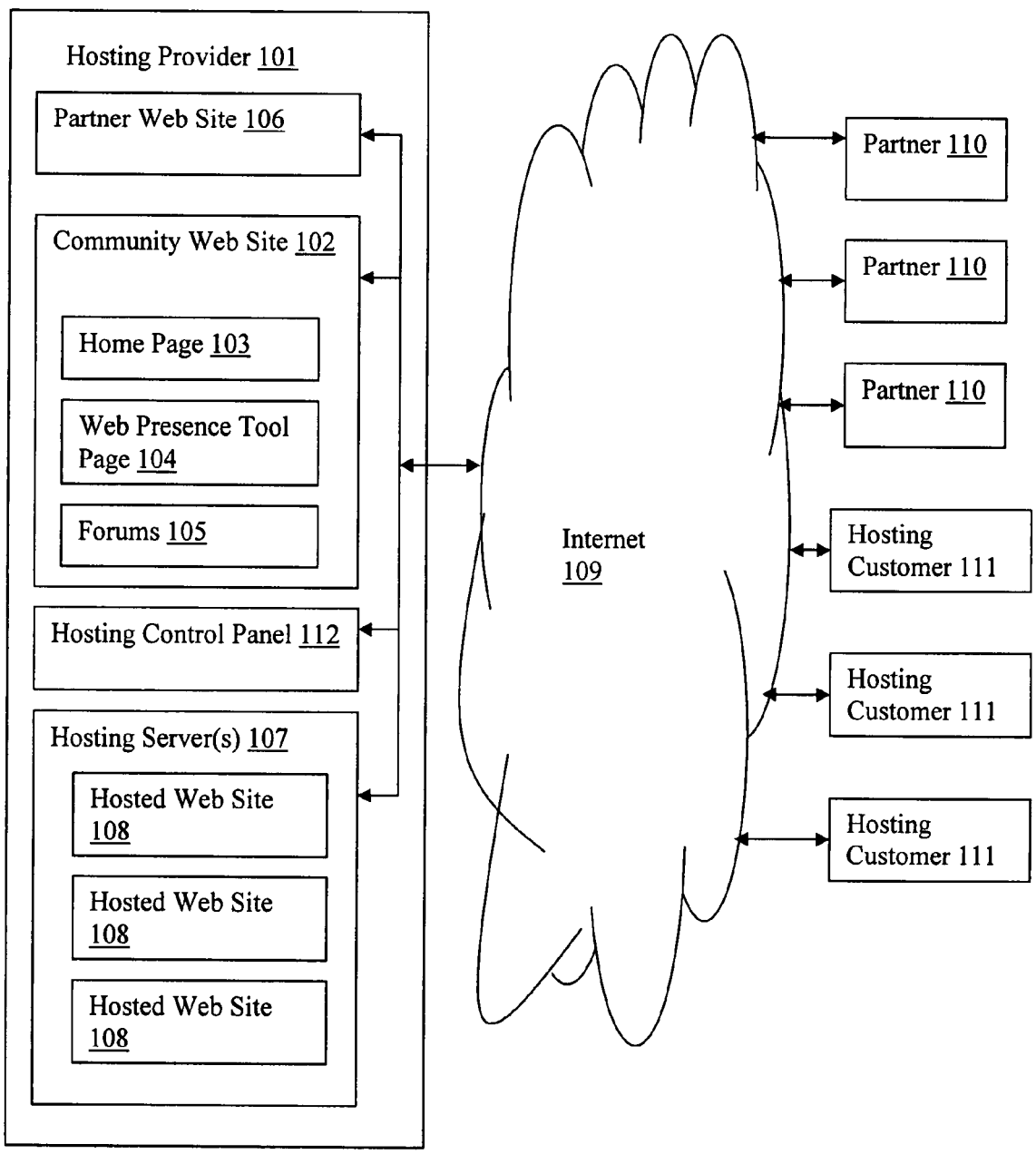
FIG. 1 illustrates a block diagram of a possible embodiment of a Web Hosting Community.

The present invention will now be discussed in detail with regard to the attached drawing figures which were briefly described above. In the following description, numerous specific details are set forth illustrating Applicants' best mode for practicing the invention and for enabling one of ordinary skill in the art to make and use the invention. It will be obvious, however, to one skilled in the art that the present invention may be practiced without many of these specific details. In other instances, well-known machines and process steps have not been described in particular detail in order to avoid unnecessarily obscuring the present invention. Unless otherwise indicated, like parts and processes are referred to with like reference numerals.

A Web Hosting Community

A sample embodiment of a Web Hosting Community 100 is illustrated in FIG. 1. The illustrated embodiment includes a Hosting Provider 101, a plurality of Partners 110 and a plurality of Hosting Customers 111. The Hosting Provider 101, Partners 110, and Hosting Customers 111 may be natural persons or legal entities (or any combination thereof) and may be unrelated except for their participation in the Web Hosting Community 100. The Hosting Provider 101 may provide the Internet Web Sites, Hosting Server(s) 107, and general infrastructure necessary to offer hosting services to Internet users. The Internet users that purchase hosting services from the Hosting Provider 101 become the Hosting Customers 111. Application distributors that wish to sell their application(s) to Hosting Customers 111 within a Web Hosting Community 100 may become Partners 110. The Partners 110 may have software programs or Internet services, i.e. applications, which the Partners 110 may desire to sell to the Hosting Customers 111 of the Hosting Provider 101.

The Web Hosting Community 100 may allow for the easy and robust exchange of information between the Hosting Provider 101, Partners 110 and Hosting Customers 111. The illustrated Web Hosting Community 100 is particularly good at providing information from the Partners 110 to the Hosting Customers 111 (such as advertisements or reference materials) and from Hosting Customers 111 to other Hosting Customers 111 (such as customers' reviews or testimonials via forums created and maintained by the Hosting Provider 101). The Partners 110 may use the Web Hosting Community 100 to easily advertise, describe and even download their applications to the Hosting Customer's Hosted Web Sites 108.

The Hosting Provider 101 may offer hosting services to Hosting Customers 111 on the Hosting Provider's 101 one or more Hosting Servers 107. In preferred embodiments the Hosting Provider 101, in addition to providing hosting services, may also offer other products and services, especially those that the Hosting Customers 111 are likely to purchase. For example, the Hosting Provider 101 may also be a Registrar or Reseller of domain names, an issuer of SSL certificates and sell other products related to domain names, hosting services, and electronic commerce. The Hosting Provider 101 may also be an OEM and/or distributor of applications for use on Hosted Web Sites 108.

The Hosting Provider 101 may also make external applications from third parties available to the Hosting Customers 111. The Hosting Provider 101 may review the external applications and if they meet the standards (such as for quality, security, and compatibility) set by the Hosting Provider 101, the Hosting Provider 101 may enter into an agreement with the third party to offer the third party's application to the Hosting Customers 111. These applications do not have to be loaded on the Hosted Web Sites 108 (although they can be), but may be stored on the third party's servers and made available for the purchasing Hosting Customer's 111 Hosted Web Sites 108 to use via the Internet. The Hosting Provider 101 may resell these services to its Hosting Customers 111 and then, if desired by the purchasing Hosting Customer 111, automatically make the purchased application available to the Hosted Web Site 108. This process greatly increases the number of available applications available to the Hosting Customers 111 and streamlines/simplifies the process for Hosting Customers 111 to make these third party applications accessible to the Hosting Customer's 111 Hosted Web Site 108.

The Hosting Servers 107 may have the hardware and software needed for dedicated hosting, virtual dedicated hosting, shared hosting, managed hosting, temporary time sliced hosting, and/or other types of hosting that are currently known or will be developed in the future. Dedicated hosting places a single Hosted Web Site 108 on a single Hosting Server 107. This provides the Hosting Customer 111 with the maximum amount of resources (bandwidth, memory space, etc.), but it is also the most expensive. Virtual dedicated hosting allows a plurality of Hosting Customers 111 to be placed on a single Hosting Server 107. Software may be used on the virtual dedicated Hosting Server(s) 107 to provide much of the same functionality as dedicated hosting, with lower cost. Shared hosting allows a very large number (current shared hosting technology allows thousands) of Hosting Customers 111 to use the resources of a single Hosting Server 107. This greatly lowers the cost, but also greatly limits the capabilities and resources that may be used by each shared Hosting Customer 111.

The Hosting Provider 101 may also provide one or more Web sites to facilitate the communications between the Hosting Provider 101, Partners 110, and Hosting Customers 111. For example, in a preferred embodiment the Hosting Provider 101 may create and maintain at least a Partner Web Site 106 and a Community Web Site 102. The Partner Web Site 106 and Community Web Site 102 (or other Web sites used to distribute information and products/services) may be stand alone Web sites (possibly even on different servers at different facilities) or may be parts (related and linked web pages) of a larger Web site or some combination thereof. The Hosting Provider 101 will preferably have unlimited access to review/edit all parts of the Web sites and monitor the Web sites for accurate and appropriate information.

A Community Web Site

If used, the Community Web Site 102 may be made open to all Internet users or restricted to allow only Partners 110 and Hosting Customers 111 to have access. One possible method of restricting access is to require Partners 110 and Hosting Customers 111 to verify their identity at a Hosting Control Panel 112 prior to accessing the Community Web Site 102, through the use of passwords or other login identification method.

Figure 5:
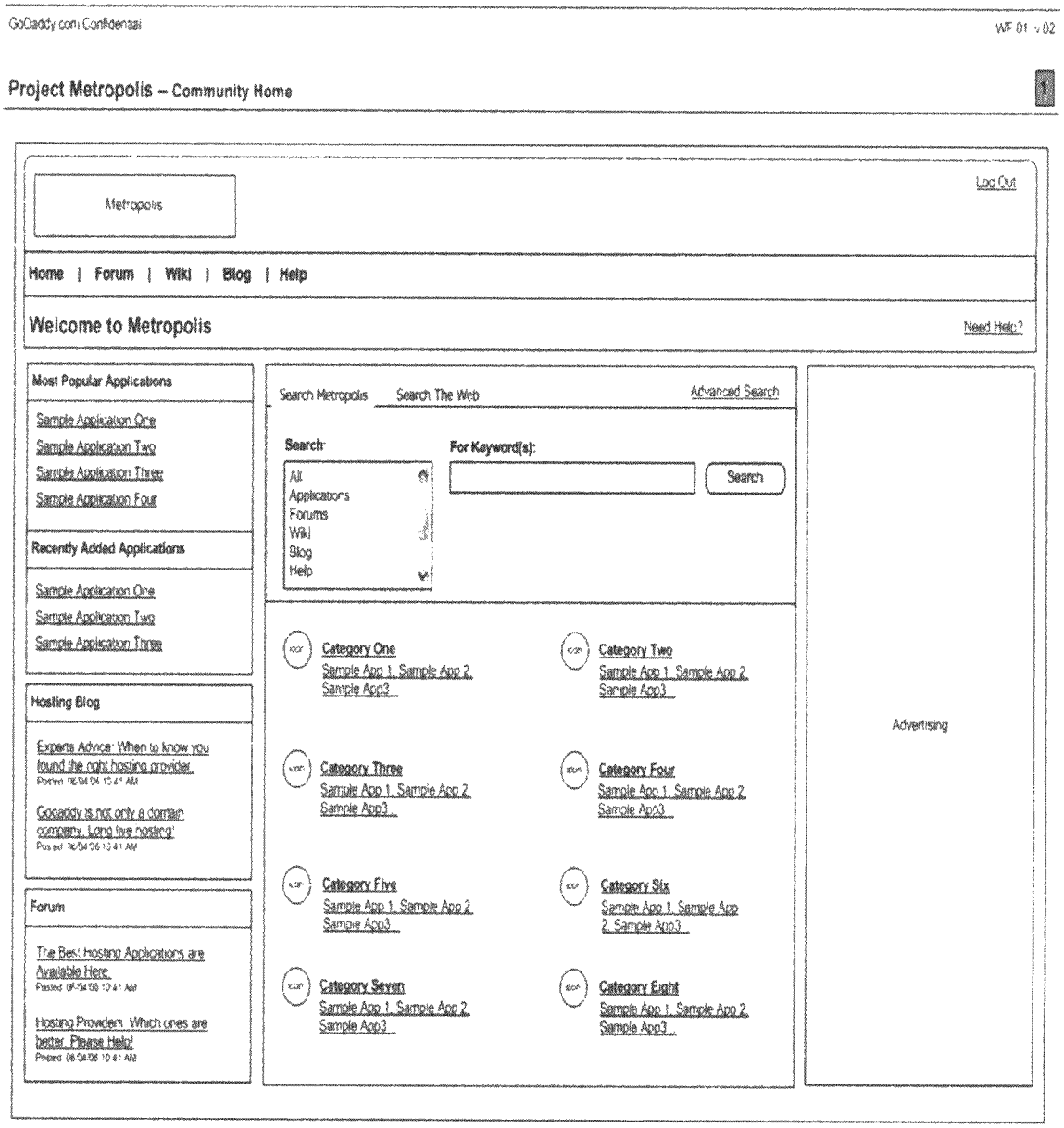
FIG. 5 is a screen shot of an example Web page that may be used as a Home page for a Community Web Site.

The Community Web Site 102 may include a Home Page 103 from which the Internet users (or only Partners 110 and Hosting Customers 111) may initially access the Community Web Site 102. An example Home Page 103 is illustrated in FIG. 5. From the Home Page 103, Partners 110 and Hosting Customers 111 may access other Web pages in the Community Web Site 102 via drop down menus or other types of links as is known in the art to navigate a Web site. The Home Page 103 is an ideal place for application ads since all the traffic visiting the Community Web Site 102 will initially view the Home Page 103 before proceeding to other Web pages.

Figure 9:
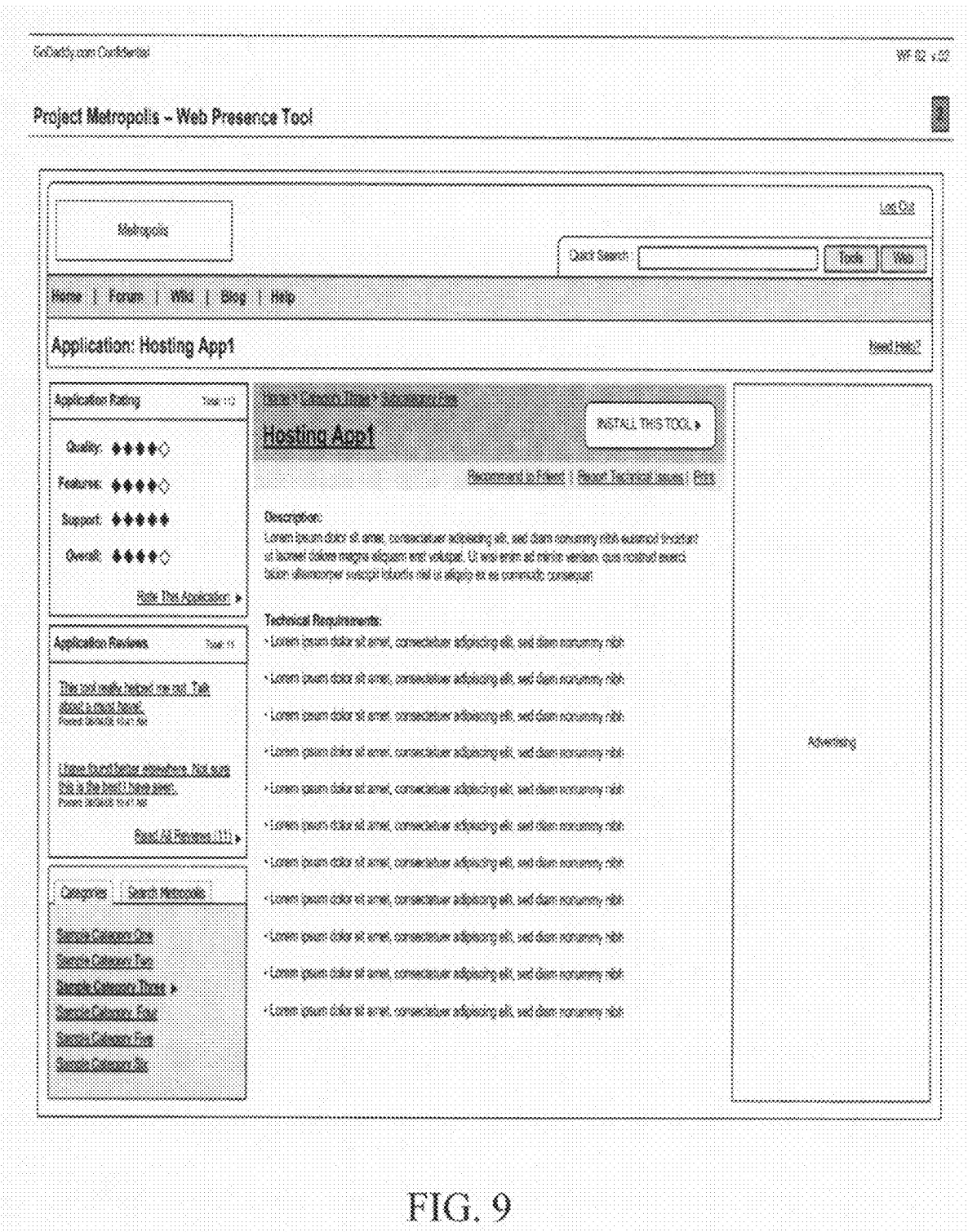
FIG. 9 is a screen shot of an example Web Presence Tool Page.

The Community Web Site 102 may include a plurality of Web Presence Tool Pages 104. FIG. 9 illustrates one possible embodiment of a Web Presence Tool Page 104. The information content of the Web Presence Tool Pages 104 may be created by the Hosting Provider 101, Partners 110 and/or Hosting Customers 111. The Hosting Provider 101 may initially create the Web Presence Tool Pages 104 to accommodate one or more of the applications available to the Hosting Customers 111. The Partners 110 may create (preferably from the Partner Web Site 106) information regarding their applications, such as an application description and instructions for installing and using the application, that is stored and viewable from the Community Web Site 102. In addition, the Web Presence Tool Pages 104 may include a link to a Web site having application support information created and maintained by the Partner 110.

The Community Web Site 102, and preferably on a Web Presence Tool Page 104, may show if the application is compatible with the hosting account or Hosted Web Site 108 of the Hosting Customer 111 as well as what the Hosting Customer 111 has to do to get a compatible hosting account or Hosted Web Site 108. As examples, certain applications may require a particular operating system, processor(s), disk space, RAM, bandwidth, etc. or may require an upgraded Hosted Web Site 108 (that has the compatible/sufficient resources) to be used.

Hosting Customers 111 may be allowed to enter reviews, testimonials or other information on the Community Web Site 102, such as on the Web Presence Tool Pages 104, which may be useful for other Hosting Customers 111 interested in purchasing the application. The applications may be provided by the Hosting Provider 101 and/or Partners 110 (a Hosting Customer 111 may also be a Partner 110 if the Hosting Customer has an application(s) to sale). The Community Web Site 102, from either the Web Presence Tool Pages 104 or from other web pages, may allow Hosting Customers 111 to purchase (and possibly download) one or more applications to the Hosting Customers' 111 Hosted Web Sites 108. The Community Web Site 102 may also include features so that the Hosting Customers 111 may easily pay for their purchased applications.

The Community Web Site 102 may also include one or more Product and Community Forums 105. The Hosting Provider 101 may create the forums and monitor the content of the forums for accuracy, civility and usefulness. The Product and Community Forums 105 may be, as examples, in a general forum format or in a Wiki format. Regardless of the format used for the forums, the Hosting Provider 101, Partners 110, and/or Hosting Customers 111 may contribute information, such as support articles related to particular applications, which may be viewable by other members of the Web Hosting Community 100.

Figure 8:
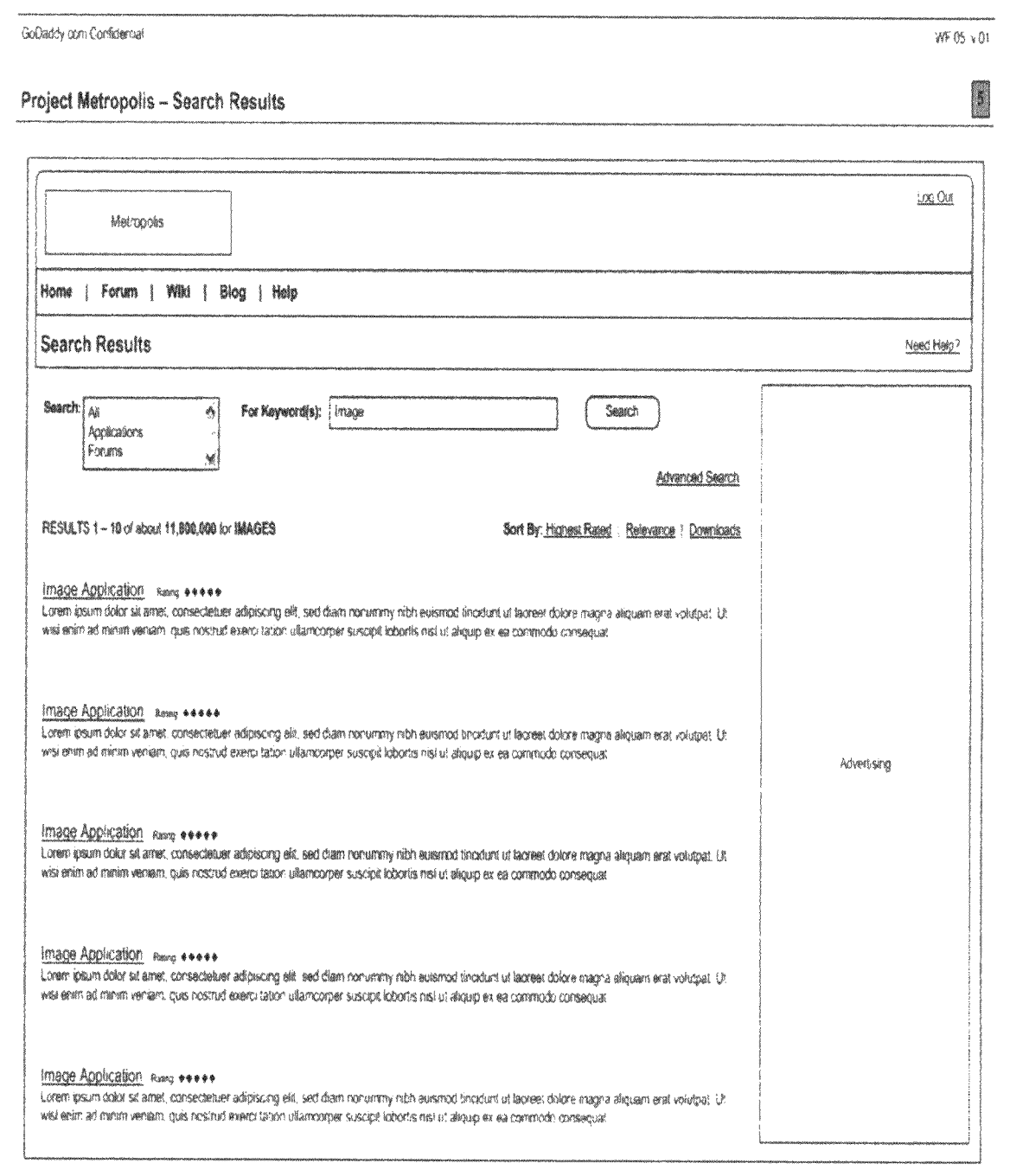

In some embodiments, certain forums may be created that are restricted as to who may contribute, edit or read the information presented in the forum. For example, a forum may be created that may only be written to and read by Hosting Customers 111. As another example, a forum may be created for a particular Partner 110 to contribute information regarding one or more applications that may be viewed by the Hosting Customers 111. Other forums may also be created that are limited as to their subject matter, such as a forum related to a particular application or a forum providing guidance on technical issues for setting-up a Hosted Web Site 108. An example of a Web page within the Community Web Site 102 for searching for a particular keyword is illustrated in FIG. 8.

The Community Web Site 102 may also offer other applications or services to the Hosting Customer 111 to allow the Hosting Customer 111 to purchase virtually everything they need for their Hosted Web Site 108. As examples, the Hosting Customer 111 may also determine the availability and purchase one or more domain names (possibly even before purchasing hosting services) as well as electronic commerce tools from the Community Web Site 102.

A Partner Web Site

The Partner Web Site 106 is preferably restricted so that only Partners 110 may access the Partner Web Site 106. The Partner Web Site 106 may include information for Partners 110 on how the Partners 110 may integrate their applications into the Web Hosting Community 100. Information specific for Partners 110, such as how to make a Partner's application available on line to Hosting Customers 111 and information on how to arrange to be paid for applications purchased by Hosting Customers 111 are examples of topics that may be provided to the Partners 110 on the Partner Web Site 106. Much of the information may be provided by the Hosting Provider 101, but on-line forums, monitored by the Hosting Provider 101, may also be provided so that Partners 110 may provide each other information based on their experiences in using the features provided in the Web Hosting Community 100.

Figure 6:
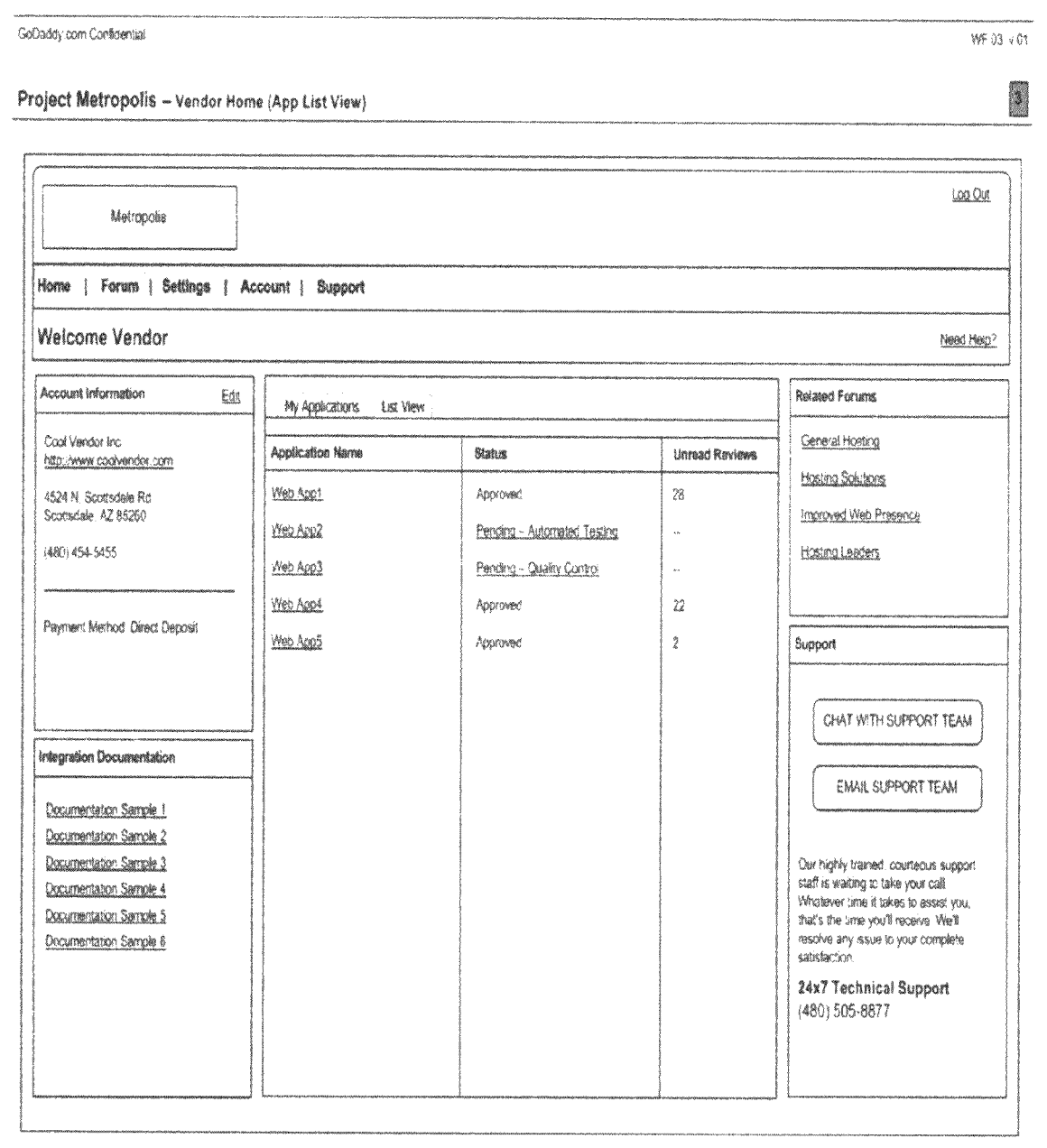
Figure 7:
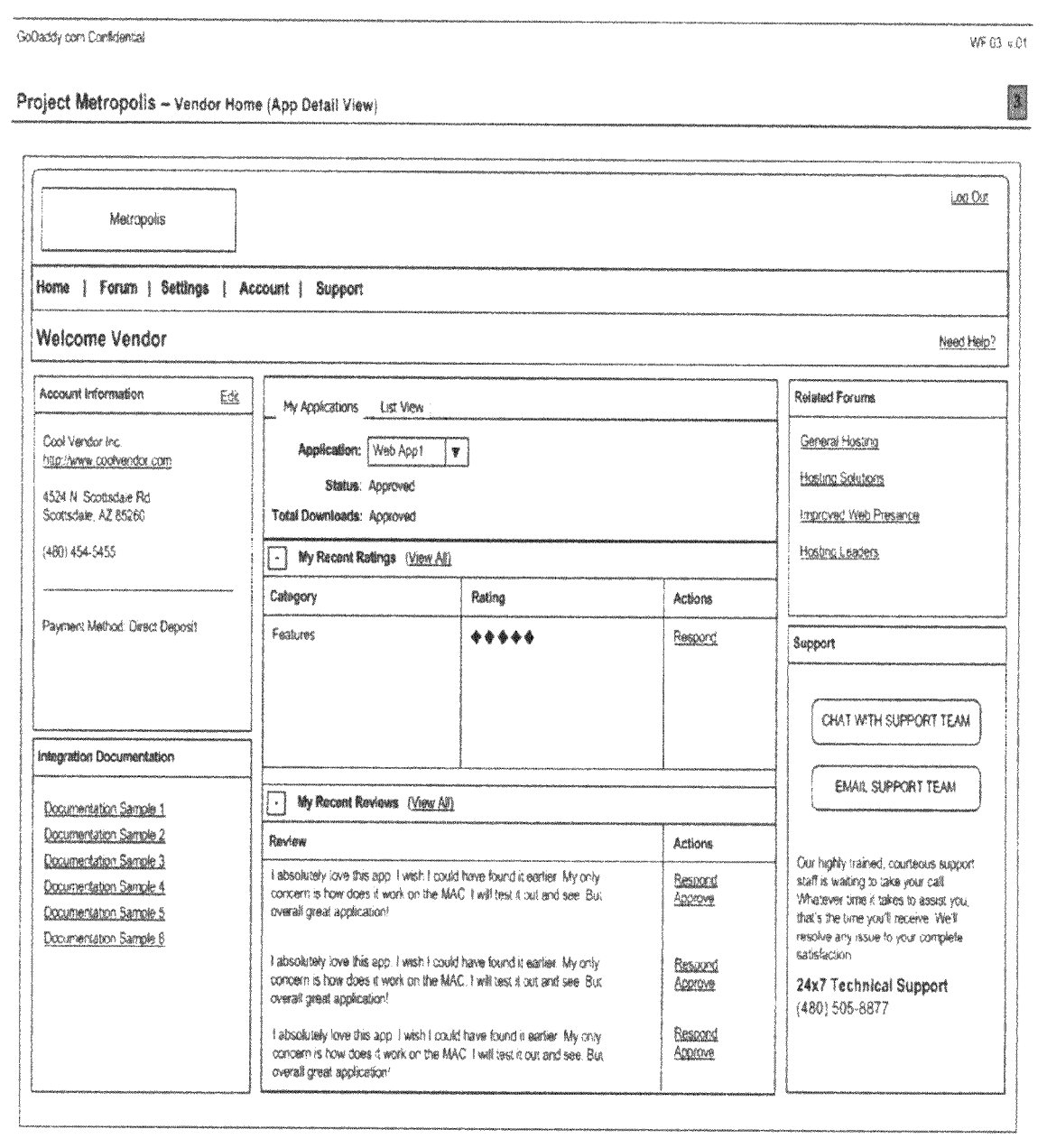

The Partner Web Site 106 may also allow a Partner 110 to modify a Web Presence Tool Page 104 (on the Community Web Site 106) that discusses that Partner's 110 application program. The Partner Web Site 106 may also allow a Partner 110 to read and respond to reviews and ratings displayed on the Community Web Site 102 regarding the Partner's applications. Example Web pages are shown in FIG. 6 and FIG. 7 that may be used within the Partner Web Site 106.

The integration process may include a certification process for Partners 110 to integrate their application into the Web Hosting Community 100. The certification process may be created, designed and operated by the Hosting Provider 101. The purpose of the certification process is to provide a level of assurance to the Hosting Customers 111 that the applications submitted by the Partners 110 have gone through a review for quality, security and/or compatibility with the Hosting Customer's Hosted Web Site 108.

A Sample Process for Practicing the Invention

Figure 2:
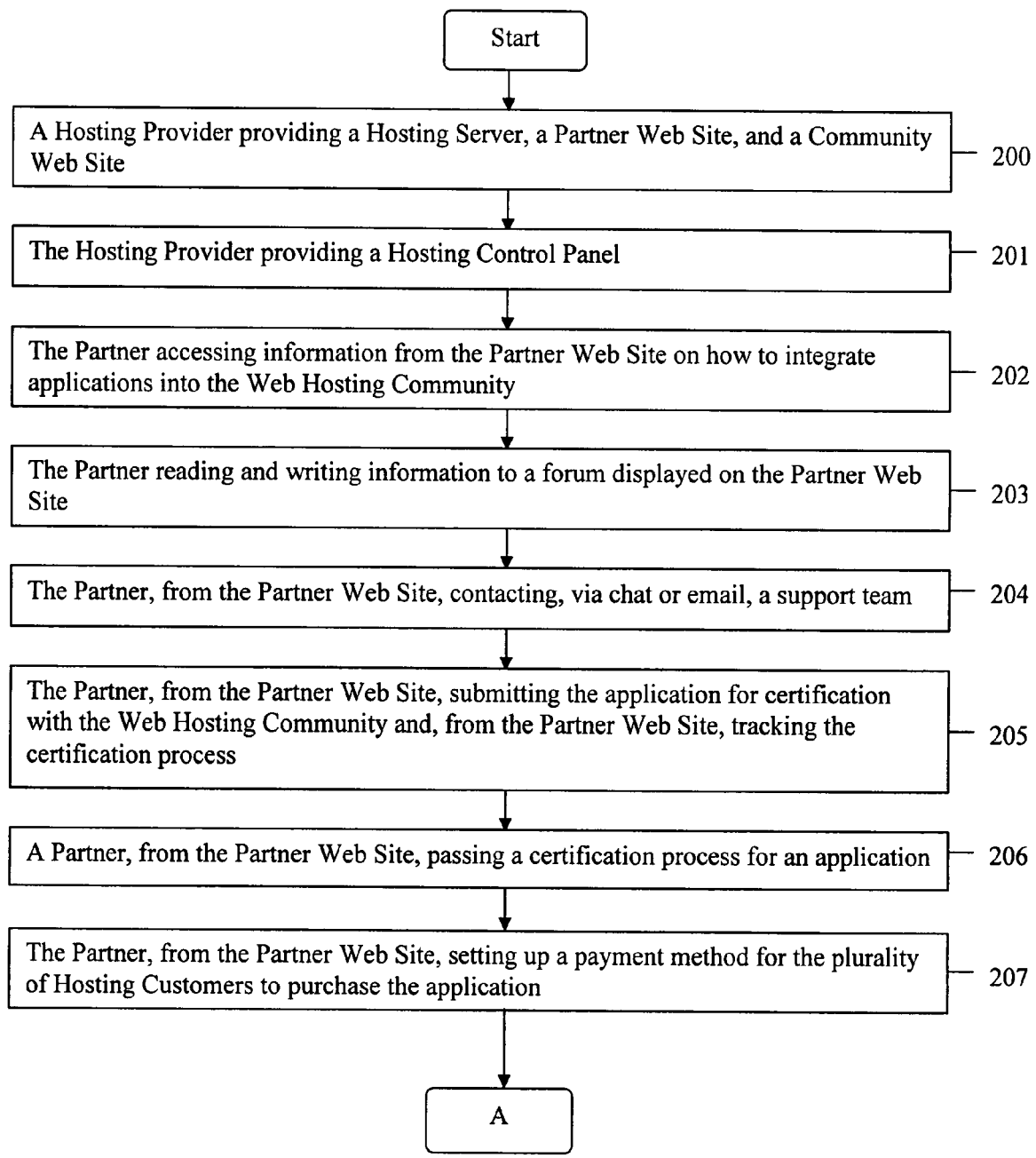
FIG. 2 is a flow diagram illustrating possible steps that may be taken within a Web Hosting Community.
Figure 3:
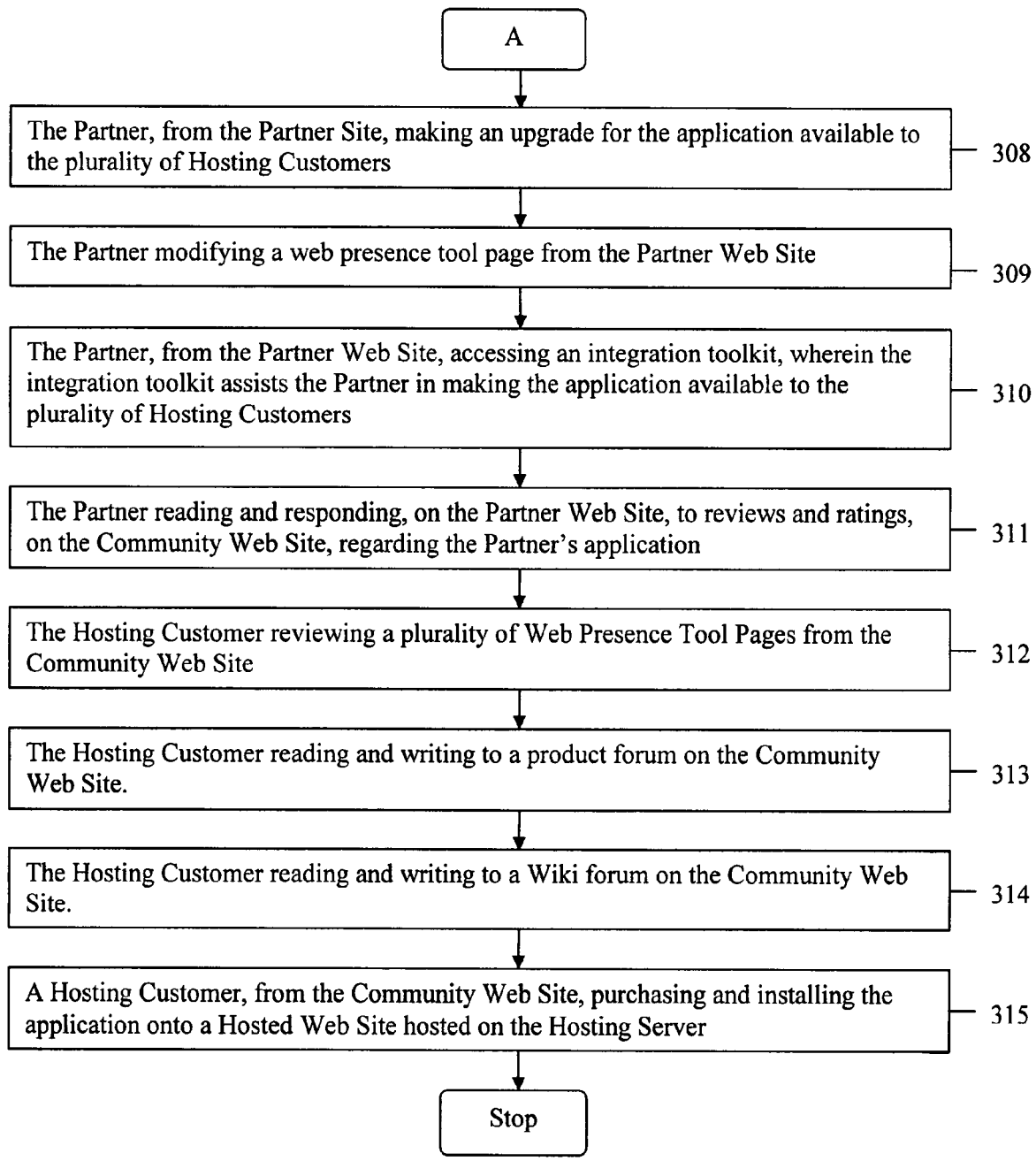
FIG. 3 is a continuation of FIG. 2 and is also a flow diagram illustrating possible steps that may be taken within a Web Hosting Community.

A sample process of practicing the invention will now be discussed with reference to the flowcharts in FIGS. 2-4. The Hosting Provider 101 is the driving force, particularly in the beginning, for creating a Web Hosting Community 100. The Hosting Provider 101 has to provide at least one, and preferably many, Hosting Servers 107. The Hosting Server(s) 107 are preferably located in a single facility. However, do to practical considerations, multiple data centers may have to be used if a single data center is not able to physically house and provide all the resources needed for the number of Hosting Servers 107 operated by the Hosting Provider 101. If a plurality of data centers is used, they may be connected via a high speed network such as a Local Area Network (LAN), Wide Area Network (WAN), Internet or other high speed packet-switched network. In a preferred embodiment, each data center will have a central hub coordinating the Hosting Servers 107 at that data center with other central hub(s) coordinating the Hosting Servers 107 in their respective data center(s).

As part of building the Web Hosting Community 100, the Hosting Provider 101 may want to assist Hosting Customers 111 in purchasing and downloading applications to the Hosting Customers' Hosted Web Sites 108. The Hosting Provider 101 may develop or purchase applications that are made available to the Hosting Customers 111. However, Hosting Providers 101 typically will not be able to directly sell all the applications that may be desired by their Hosting Customers 111. To expand the number of available applications to the Hosting Customers 111, the Hosting Provider 101 may allow one or more Partners 110 to offer their applications directly to the Hosting Customers 111 of the Hosting Provider 101.

There are many different ways for a Partner 110 to make its applications available to the Hosting Customers 111 of a Hosting Provider 101. In one embodiment, a single master Web site may be used by the Hosting Provider 101 to create the Web Hosting Community 100. In the master Web site embodiment, Partners 110 and Hosting Customers 111 may have access to different Web pages or Forums 105 and have different rights in adding or modifying content to the different areas on the different Web pages.

In another embodiment, a plurality of different Web sites may be created to build the Web Hosting Community 100. In the plurality Web site embodiment, different Web sites may be used to perform different functions with the Partners 110 and Hosting Customers 111 having different levels of access and rights in each of the Web sites. For example, one or more Web sites may be created for sharing information that may be accessed and edited by both Partners 110 and Hosting Customers 111 while another Web site may be limited to only allow Partners 110 access so that Partners 110 may modify or update their applications.

In a preferred embodiment, the Hosting Provider 101 creates at least a Partner Web Site 106 and a Community Web Site 102 as part of building the Web Hosting Community 100 (Step 200). The Partner Web Site 106 may be made accessible to the Partners 110 and the Community Web Site 106 may be made accessible to the Partners 110 and the Hosting Customers 111. Access may be restricted as desired from other Internet users by the use of passwords, checking previous visited Web pages or by other techniques known for controlling access to a Web site. The Hosting Provider 101 may also create a Hosting Control Panel 112 accessible to the Hosting Customers 111 which gives each Hosting Customer 111 control over its Hosted Web Site 108 (Step 201).

Once the Partner Web Site 106 is made available to the Partners 110, the Partners 110 may access the Partner Web Site 106 to accomplish many different tasks. For example, Partners 110 may be able to access the Partner Web Site 106 to receive information on how to integrate the Partner's 110 applications into the Web Hosting Community 100 (Step 202). Information for integrating an application into the Web Hosting Community 100, or any other information that may be useful to the Partners 110, may be presented in a variety of different formats. As non-limiting examples, the information may be displayed on informational Web pages, in downloadable .pdf files, in discussion forums or in a Wiki format which are all accessible from the Partner Web Site 106. The Hosting Provider 101 will typically create a core amount of basic information regarding the Web Hosting Community 100 on the Partner Web Site 106 which is subsequently updated and added to by the Hosting Provider 101 and Partners 110. One or more forums may also have been created by the Hosting Provider 101 to answer specific questions or to allow the Partners 110 to help and answer each other's questions (Step 203).

In addition, the Partner Web Site 106 may provide access to tools, such as an instant messaging service, chat room and/or email option, necessary to contact a support team provided by the Hosting Provider 101 (Step 204).

In a preferred embodiment, only Partners 110 that have passed a certification process are allowed to submit their applications for inclusion in the Web Hosting Community 100. Information regarding the certification process may be presented and updated within the Partner Web Site 106 by the Hosting Provider 101 and may be added to or commented on by other Partners 110. Partners 110 that have already put their applications through the certification process are in an ideal position to give advice, suggestions and answer questions from the newer Partners 110. In a preferred embodiment, a Partner 110 may submit the Partner's application for certification and then track the progress of the certification process entirely from the Partner Web Site 106 (Step 205).

A Sample Certification Process

Figure 4:
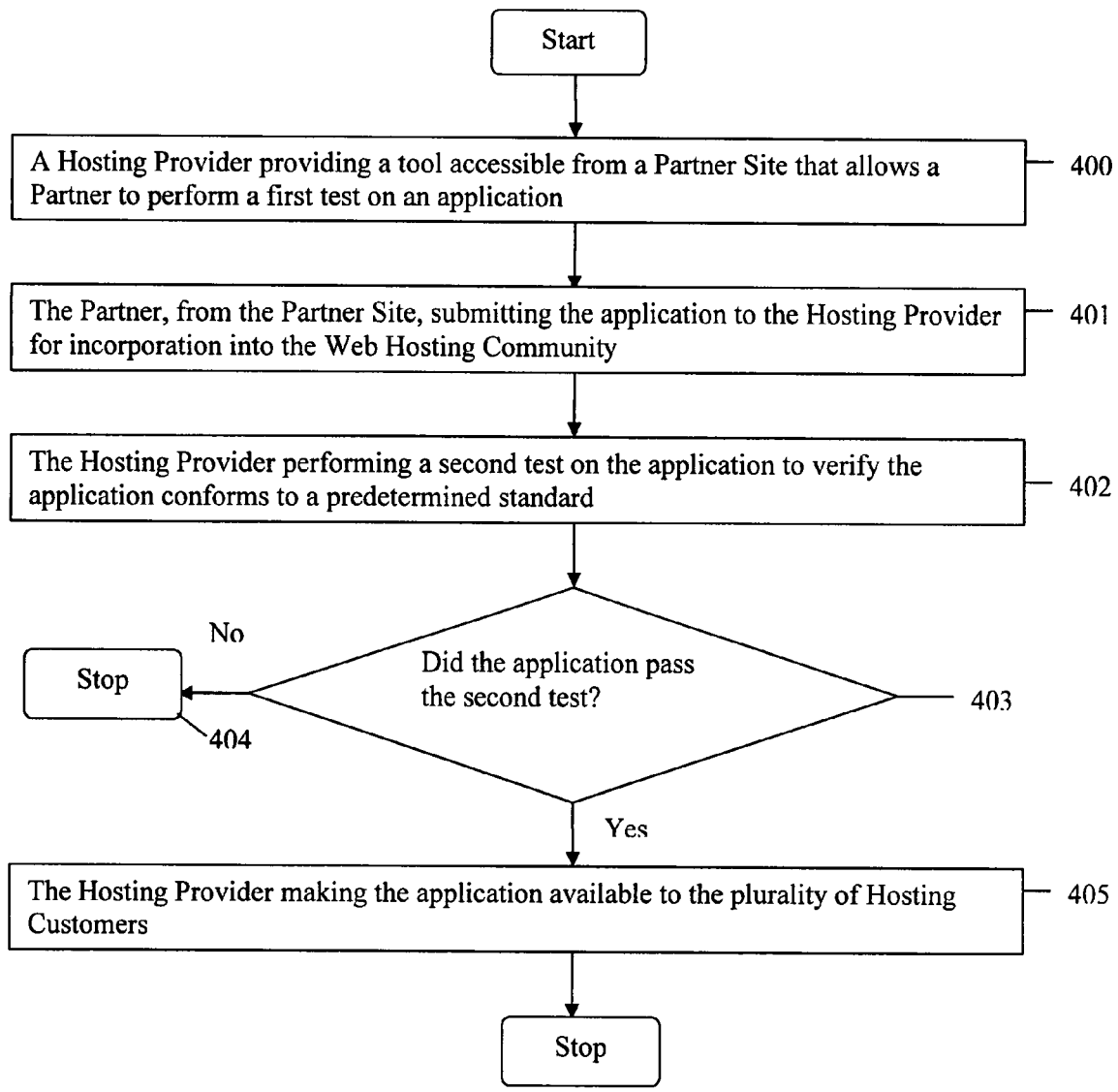
FIG. 4 is a flow diagram illustrating possible steps that may be taken to incorporate an application within a Web Hosting Community.

A possible certification process of an application is illustrated in the flowchart at FIG. 4. If a certification process is used, it may serve one or more purposes. As examples of such purposes, the certification process may be used to screen out applications with quality, reliability or compatibility problems with the Hosting Servers 107. A certification process may also check for computer viruses, malware, malicious applications, or other types of computer software that would be disruptive to the Web Hosting Community 100 or its members 101, 110, 111. The certification process may also check for performance characteristics, such as CPU usage. Quality assurance processes may also be performed automatically via software or by having quality control employees test the application for performance, security, installation quality, technology compatibility (works with the versions of software running on the Web Servers 107), and payment processing.

The Hosting Provider 101 may provide a tool, preferably accessible from the Partner Web Site 106, which allows a Partner 110 to run a first test on the Partner's 110 application (Step 500). The tool may parse the code of the application searching for problems such as viruses, worms, Trojan horses, spyware, adware and other types of malware. The tool may also check to see if the application is on a list of applications with known problems. The tool may focus on whether the application can meet predetermined standards regarding installation, packaging, and if the application will be able to flow through the rest of the certification process. If one or more problems are found for the application during the test, the tool may describe the problem(s) to the Partner 110, preferably on the Partner Web Site 106, and possibly provide suggestions. The suggestions may be directed to how the Partner 110 can get the application into condition for it to be submitted for the certification process so that, if the application passes the certification process, the application will be accepted into the Web Hosting Community 100.

The Partner 110, again preferably from the Partner Web Site 106, may submit its application for incorporation into the Web Hosting Community 100 (Step 501) (certification process) either with or without running the first test. The certification process may require the application to be reviewed to make sure it conforms to a predetermined standard (Step 502). The predetermined standard may require searching for many, all or even additional problems compared to the first test that may have been performed. The certification process may be a manual quality control test where a person is using and testing the application, an automated security control test to make sure the application does not create any security problems for the Web Hosting Community 100, an automated test to check for compatibility or reliability issues or some combination thereof. A thorough certification process will greatly add to the health, reliability and efficiency of the Web Hosting Community 100.

If an application submitted for certification is found not to conform to the predetermined standard (Step 502), the application is prevented from entering the Web Hosting Community 100, i.e. Hosting Customers 111 may not use the application or load the application on their Hosted Web Sites 108, and the Partner 110 may be so notified on the Partner Web Site 106 along with a description of the problem(s) (Step 503). A failure of an application to pass the certification process will preferably be kept confidential between the Hosting Provider 101 and the Partner 110. The Partner 110 may then try to correct the problem(s) with the application (if possible) and resubmit the application for certification.

If the application passed the certification process (Step 206), the Partner 110 may perform various actions to integrate the application into the Web Hosting Community 100. For example, the Partner 110, preferably from the Partner Web Site 106, may use a process setup by the Hosting Provider 101 to assist the Hosting Customers 111 in purchasing and receiving access to the now certified application (Step 307). The Partner 110 may also make available information regarding the application to the Hosting Customers 111. In preferred embodiments, the Partner 110, from the Partner Web Site 106, creates a Web Presence Tool Page 104 which is accessible to the Hosting Customers 111 from the Community Web Site 102 (Step 308). By building a plurality of Web Presence Tool Pages 104, Hosting Customers 111 may easily gain access to information regarding many, and preferably all, of the applications that have been certified and thus available for use by the Hosting Customers 111 within the Web Hosting Community 100.

Once the application passes the certification process, the application may then be made available to the Hosting Customers 111 (Step 504). This process may be technically complicated, so the Hosting Provider 101 may provide an integration toolkit, accessible from the Partner Web Site 106, to the Partners 110 for making certified applications easily available to the Hosting Customers 111 (Step 309). Depending on the application and how it gets integrated into the Web Hosting Community 100, the Hosting Customer 111 may be permitted to download the application to their Hosting Server 107 or the application may be stored on a separate server operated by the Hosting Provider 101 and the Hosting Customer 111 is then permitted to use the application.

The Partner 110 may also review comments made by Hosting Customers 111 related to the Partner's application (or other applications from other Partners). In preferred embodiments, the Partner 110 reviews the comments from either the Partner Web Site 106 or the Community Web Site 102. This information may be used by the Partner 110 to enhance or correct problems with the application. The Partner 110 may also be allowed to respond to Hosting Customers' 111 comments or questions in certain forums. The Partner 110 may be allowed to respond to the Forums 105 from the Partner Web Site 106 or the Partner 110 may have a password or another method of identifying the Partner 110 as the owner of the application in question to respond directly in Forums 105 as the Partner 110 for that application (Step 310).

After Partners 110 stored information regarding their applications on the Community Web Site 102, Hosting Customers 111 then have a one-stop method of reviewing information regarding the applications available within the Web Hosting Community 100 from the Community Web Site 102 (Step 311). The information may be organized on Web Presence Tool Pages (a web page associated with preferably one or optionally a very small number of applications), Forums 105 that may be related to various topics of interest within the Web Hosting Community 100, chat rooms, automated email notices when new applications or updates are available, blogs within the Web Hosting Community 100 or other known methods of sharing information within a Web site (Step 311). Hosting Customers 111 may also contribute information within the Web Hosting Community 100, such as by contributing to various Forums 105, Wikis, chat rooms, etc., preferably stored and accessed within the Community Web Site 102 (Steps 312 & 313).

Hosting Customers 111 may also purchase and install applications for their Hosted Web Site 108 from within the Web Hosting Community 100, and preferably from within the Community Web Site 102 (Step 314). The Web Hosting Community 100 may be setup such that Hosting Customers 111 may purchase and have the application available for their Hosted Web Site 108 as fast as the software and electronics with the Web Hosting Community 100 will allow. As part of the setup process, one or more databases may be updated for billing, amount owed to Partners 110, and inventory/resource tracking purposes. File and directory permissions within the Hosting Server 107 and within the Web Hosting Community 100 may also be setup according to the hosting plan and applications purchased by the Hosting Customer 111. License key(s) may be automatically generated and made accessible for the Hosting Customer 111 as required by the purchased application(s).

If the desired application is incompatible in any way with the Hosting Customer's Hosted Web Site 108, software within the Web Hosting Community 100 may detect this problem and automatically correct the problem or offer an upgraded or different Hosted Web Site 108 to the Hosting Customer 111 that is compatible with the desired application (and preferably also with the other applications already purchased by the Hosting Customer 111). In preferred embodiments, compatibility information between applications and the Hosting Customer's Hosted Web Site 108 is made available to the Hosting Customer 111 prior to the Hosting Customer 111 purchasing the application. The Hosting Customer 111 may also receive specific information on what the Hosting Customer 111 or the Web Hosting Community 100 would need to do to make the Hosting Customer's Hosted Web Site 108 compatible with all the available applications. This process will ensure that the Hosted Web Site 108 will remain compatible with the various applications purchased by the Hosting Customer 111.

In addition, a Hosting Control Panel 112 may be provided for controlling different parameters or operating conditions of a Hosted Web Site 108. As examples, the Hosting Customers 111 may be able to remove or reinstall an application, change passwords, set basic configuration settings, migrate applications between different hosting accounts and domains from the Hosting Control Panel 112.

The Web Hosting Community 100 may also facilitate the notification to Hosting Customers 111 and/or the automatic installation of patches for the applications. Partners 1100, preferably from the Partner Web Site 106, may make patches/updates/upgrades available (either for free or for a fee) for the Hosted Web Sites 108. The patches/updates/upgrades may be subjected a certification process similar to the certification process described for the applications themselves. For Hosting Customers 111 that give their permission, free patches/updates/upgrades may be automatically incorporated into their Hosted Web Sites 108 as soon as they are made available to the Web Hosting Community 100.

If all the preferred features of the invention are used, Hosting Customers 111 may receive information regarding a variety of different applications from the distributing Partner 110 and from other Hosting Customers 111, be assured that the application has gone through a certification process, purchase the application, have the application automatically made available or even installed on their Hosted Web Site 108, and be able to provide reviews to other Hosting Customers 111, all quickly and easily from the Community Web Site 102. In addition, if all the preferred features of the invention are used, Partners 110 may be able to receive information on how to integrate their application into a Web Hosting Community 100, setup a payment method for receiving funds when Hosting Customers 111 purchase their application, provide documentation to Hosting Customers 111, submit their applications for certification, respond to information on various Forums 105, and integrate their application into a Web Hosting Community 100 so that Hosting Customers 111 may purchase and install their application at a single Web site, all quickly and easily from the Partner Web Site 102. Of course, not all of the disclosed features have to be used in every embodiment and different orders of events may also take place while still falling within the scope of the claimed subject matter as set forth in the following claims.

What is claimed is:

1. A method of using a Partner Web Site to assist in offering applications to a Web Hosting Community, comprising the steps of:
   a) a Hosting Provider providing web hosting services to a plurality of Hosting Customers having a Hosted Web Site on the Hosting Provider's one or more Hosting Servers;
   b) the Hosting Provider creating a Partner Web Site and a Community Web Site;
   c) the Hosting Provider enabling a Partner, from the Partner Web Site, to make an application available to the plurality of Hosting Customers of the Hosting Provider; and
   d) the Hosting Provider enabling at least one of the plurality of Hosting Customers, from the Community Web Site, to utilize the application with the Hosted Web Site located on the Hosting Provider's one or more Hosting Servers.

2. The method of claim 1, further including the step of the Hosting Provider enabling the Partner, to use a forum in the Partner Web Site, to share information with a plurality of other Partners on how to offer other applications to the plurality of Hosting Customers.

3. The method of claim 1, further including the step of the Hosting Provider enabling the Partner, from the Partner Web Site, to receive information on how to register the application for purchase by the plurality of Hosting Customers.

4. The method of claim 1, further including the step of the Hosting Provider enabling the Partner, from the Partner Web Site, to receive information on how to make the application accessible to the plurality of Hosting Customers.

5. The method of claim 1, further including the steps of the Hosting Provider enabling the Partner, from the Partner Web Site, to submit the application for certification with the Web Hosting Community; the Hosting Provider testing the application to verify the application conforms to a predetermined standard as part of the certification process; and, the Hosting Provider enabling the Partner, from the Partner Web Site, to track the certification process.

6. The method of claim 1, further including the step of the Hosting Provider enabling the Partner, from the Partner Web Site, to contact, via chat or email, a support team.

7. The method of claim 1, further including the step of the Hosting Provider enabling the Partner, from the Partner Web Site, to access an integration toolkit, wherein the integration toolkit enables the Partner to make the application available to the plurality of Hosting Customers.

8. The method of claim 1, further including the step of the Hosting Provider enabling the Partner, from the Partner Web Site, to set up a payment method for the plurality of Hosting Customers to purchase the application.

9. The method of claim 1, further including the step of the Hosting Provider enabling the Partner, from the Partner Web Site, to read and respond to a review or a rating on the Community Web Site related to the application.

10. A method of using a Partner Web Site to assist in offering applications to a Web Hosting Community, comprising the steps of:
 a) a Hosting Provider providing web hosting services to a plurality of Hosting Customers having a Hosted Web Site on the Hosting Provider's one or more Hosting Servers;
 b) the Hosting Provider creating a Partner Web Site and a Community Web Site;
 c) the Hosting Provider enabling a Partner, from the Partner Web Site, to edit a Web Presence Tool Page located within a Community Web Site; and
 d) the Hosting Provider enabling the plurality of Hosting Customers of the Hosting Provider, from the Community Web Site, to review the Web Presence Tool Page.

11. The method of claim 10, wherein the Partner Web Site includes a forum allowing the Partner to share information on how to offer other applications to the plurality of Hosting Customers.

12. The method of claim 10, wherein the Partner Web Site includes an informational area presenting information on how to register the application for purchase by the plurality of Hosting Customers.

13. The method of claim 10, wherein the Partner Web Site includes an informational area presenting information on how to make accessible the application to the plurality of Hosting Customers.

14. The method of claim 10, further comprising the step of the Hosting Provider testing the application to verify the application conforms to a predetermined standard as part of an application certificate submission and wherein the Partner Web Site includes an informational area for the Partner to track a status of the application certificate submission.

15. The method of claim 10, wherein the Partner Web Site includes a support area for direct contact via chat or email to a specialized support team.

16. The method of claim 10, wherein the Partner Web Site includes access to an integration toolkit.

17. The method of claim 10, wherein the Partner Web Site includes a payment setup area for offering the application for sale.

18. The method of claim 10, wherein the Partner Web Site includes a capability to allow the Partner to read and respond to a review or a rating on the Community Web Site related to the application.

19. A method of using a Partner Web Site to assist in offering applications to a Web Hosting Community, comprising the steps of:
 a) a Hosting Provider providing web hosting services to a plurality of Hosting Customers having a Hosted Web Site on the Hosting Provider's one or more Hosting Servers;
 b) the Hosting Provider creating a Partner Web Site and a Community Web Site;
 c) the Hosting Provider enabling a Partner, from the Partner Web Site, to edit a Product and Community Forum located on the Community Web Site; and
 d) the Hosting Provider enabling the plurality of Hosting Customers, from the Community Web Site, to review the Product and Community Forum.

20. The method of claim 19, wherein the Partner Web Site includes a forum allowing the Partner to share information on how to offer other applications to the plurality of Hosting Customers.

21. The method of claim 19, wherein the Partner Web Site includes an informational area presenting information on how to register the application for purchase by the plurality of Hosting Customers.

22. The method of claim 19, wherein the Partner Web Site includes an informational area presenting information on how to make accessible the application to the plurality of Hosting Customers.

23. The method of claim 19, further comprising the step of the Hosting Provider testing the application to verify the application conforms to a predetermined standard as part of an application certificate submission and wherein the Partner Web Site includes an informational area for the Partner to track a status of the application certificate submission.

24. The method of claim 19, wherein the Partner Web Site includes a support area for direct contact via chat or email to a specialized support team.

25. The method of claim 19, wherein the Partner Web Site includes access to an integration toolkit.

26. The method of claim 19, wherein the Partner Web Site includes a payment setup area for offering the application for sale.

* * * * *